(12) United States Patent
Atwood et al.

(10) Patent No.: US 8,296,832 B2
(45) Date of Patent: Oct. 23, 2012

(54) SYSTEM, METHOD AND COMPUTER PROGRAM, FOR ENABLING ENTRY INTO TRANSACTIONS ON A REMOTE BASIS

(75) Inventors: Margaret Atwood, Toronto (CA); John H. D. Wiltshire, Toronto (CA); Matthew M. C. Gibson, Toronto (CA); Donald Kelvin Marshall, Toronto (CA); Nemesio Carlos Garcia, St. Catherines (CA)

(73) Assignee: Syngrafii Corporation, Toronto, Ontario (CA)

( * ) Notice: Subject to any disclaimer, the term of this patent is extended or adjusted under 35 U.S.C. 154(b) by 439 days.

(21) Appl. No.: 12/300,264

(22) PCT Filed: May 10, 2007

(86) PCT No.: PCT/CA2007/000809
§ 371 (c)(1),
(2), (4) Date: May 14, 2009

(87) PCT Pub. No.: WO2007/128131
PCT Pub. Date: Nov. 15, 2007

(65) Prior Publication Data
US 2010/0011428 A1    Jan. 14, 2010

Related U.S. Application Data

(60) Provisional application No. 60/799,017, filed on May 10, 2006.

(51) Int. Cl.
*G06F 7/04* (2006.01)
(52) U.S. Cl. ............... 726/7; 713/168; 705/30; 705/44; 382/119; 382/186
(58) Field of Classification Search ...... 726/7; 713/168; 345/1; 382/119, 186; 705/30, 44
See application file for complete search history.

(56) References Cited

U.S. PATENT DOCUMENTS

| | | | | |
|---|---|---|---|---|
| 5,917,470 A | * | 6/1999 | Fujioka | 345/660 |
| 2002/0035687 A1 | * | 3/2002 | Skantze | 713/168 |
| 2004/0156537 A1 | * | 8/2004 | Chung et al. | 382/119 |

OTHER PUBLICATIONS

Electromyogram (EMG) based fingers movement recognition using neighborhood preserving analysis with QR-decomposition; Date of Conference: Dec. 6-9, 2011;Author(s): Khushaba, Rami N.; pp. 1-105.*
Design of embedded video capture system based on ARM9 Date of Conference: Apr. 15-17, 2011;Author(s): Denan Li ;pp. 2092-2095.*

* cited by examiner

*Primary Examiner* — Thanhnga B Truong
*Assistant Examiner* — Angela Holmes

(57) ABSTRACT

A system, method and computer program for enabling transactions on a remote basis is provided. The method of the present invention comprises the steps of: (1) providing a first computer at a location of a customer, and providing a second computer at a location of a financial institution, the first computer and the second computer being linked so as to provide a two-way audiovisual communication system; (2) providing an authentication request at the second computer and communicating the request to the first computer; (3) the customer reviewing the request and providing a signature or other writing as an input to an input device connected to the first computer; (5) transmitting the signature from the first computer to the second computer; (6) receiving the signature and providing the signature to a plotting device connected to the second computer; and (7) applying the signature to a transactional document, wherein the audiovisual information received by the second computer and the signature received by the second computer in combination provide a means of transaction authentication and non-repudiation.

24 Claims, 6 Drawing Sheets

SYSTEM, METHOD AND COMPUTER PROGRAM, FOR ENABLING ENTRY INTO TRANSACTIONS ON A REMOTE BASIS

This application claims the benefit of U.S. Provisional Application No. 60/799,017 filed on May 10, 2006.

FIELD OF THE INVENTION

The present invention relates to a system, method and computer program for enabling entry into transactions on a remote basis. The present invention further relates to a system, method and computer program, for enabling entry into transactions with authentication and non-repudiation on a remote basis.

BACKGROUND OF THE INVENTION

Transactions involving at least two individuals (including individuals representing businesses) in different locations are quite common.

One example of such transactions are those involving financial institutions.

There are many definitions of financial institutions. Generally speaking, a financial institution can be broadly defined as any organization in the business of moving, investing or lending money, dealing in financial instruments, or providing financial services. Financial institutions can be divided into two sub categories: banks and depository institutions and securities and investment institutions.

Banks and depository institutions include commercial banks and consumer institutions. These are institutions that are able to receive deposits from their customers. Typically they deal with money, hold money, invest money and lend money. The most important type of these institutions are commercial banks and similar organizations such as credit unions, trust companies and savings and loans which accept deposits from, and deal directly with, consumers. Money transmitters are also considered part of this group because they accept deposits and hold funds until they are transmitted to a final destination.

In addition to consumer institutions, there are financial institutions that deal directly with other banks such as the central banks of each country. These are banks that provide financial and banking services to the government of a country and its commercial banking system. They are capable of accepting deposits from commercial banks and providing credit to the commercial institutions. Most independent countries in the world have their own central bank. The exceptions are normally countries that are closely affiliated with others in the same currency zone.

Over and above national and central banks, there are a number of financial institutions that transcend individual national interests and encompass many member nations (supranational). These institutions are usually funded by member nations who make deposits according to prescribed formulae. The capital deposited can then be used for financing a member country's specific requirements. The International Monetary Fund and the World Bank are examples of supranational institutions.

Securities and investment institutions are institutions that manage and organize offerings of securities such as stocks and bonds for sale to the public, sell and trade securities and provide investment advice. In addition to stocks and bonds, these institutions may also buy and sell mutual funds, currencies and commodities.

The distinction between commercial banks and securities institutions has been somewhat blurred in recent years as the banks now typically sell mutual funds to their clients. However, investment agents/dealers and brokers specialize in securities and do not offer most banking services.

Securities companies are normally licensed to work with and sell/trade securities and are regulated closely by government agencies and trading exchanges. As might be expected, there is cross ownership and some of the large securities firms are controlled by the major banks.

The increasing worldwide integration of markets for goods, services, labour and capital makes it impossible to quantify the world markets that financial institutions operate in. Electronic communication means it takes seconds for transactions to be executed that could have at one time taken days.

Commercial banks are the institutions that are by far most numerous and involve the largest number of customers, and, as distinct from central banks and investment banks, offer a broad range of products and services to both individuals and businesses including: chequing and savings accounts, time deposits and loans. Within commercial banks, retail banking is the part of the bank's operations providing services to individual customers, as opposed to businesses.

A bank's retail operation has by far the broadest interaction with customers. Day-to-day banking activities are the ones experienced by the vast majority of customers on a frequent basis such as management of chequing or savings accounts, cash withdrawals and deposits, payment of bills, etc. Depending on the individual customers, other products such as overdrafts and consumer credit, including credit cards, and even insurance products and real estate transactions may also require frequent interaction.

Very few commercial establishments are as ubiquitous throughout the world as banks and related institutions.

It is difficult to identify how many banks and bank branch offices there are throughout the world because many countries have banks that operate only locally, but it is safe to say that the number is in the tens of thousands. According to figures provided by Canada's Department of Finance, Canada alone has close to 6,000 bank branches.

A study released in March, 2006 by the consulting firm, ACCENTURE™, shows banks are very optimistic about their growth prospects. The study, based on a survey of more than 100 retail bank executives in the U.S., Europe and Asia-Pacific, was designed to shed light on growth strategies. More than two-thirds of respondents said they will concentrate equally on retaining existing customers and attracting new ones. Key strategies include: improving data connecting capabilities with sales force workstations; channel integration to enable a single-customer view and increasing self-service access points.

According to a J.D. Power and Associates' "2006 Retail Banking Satisfaction Study", transaction interaction has the greatest impact on a U.S. customer's overall satisfaction with his/her bank. With transaction times nearly three times faster than interacting with a branch teller, on-line banking is the preferred transaction method. However, in-person branch transactions are conducted most frequently and are highest in satisfaction, followed by Automated Teller Machines or "ATM"'s and on-line transactions.

A survey conducted for the Canadian Bankers Association in 2004 indicated ATM transactions, in fact, exceed in-person transactions in Canada. While Canada has always had one of the highest ATM usage rates in the world, this confirms the importance of ATM's as a transaction vehicle. To be sure, in-person transactions are still very important (29% versus 34% for ATM's). Customers want the speed of ATM's and on-line transactions yet crave the personal interaction and attention.

J.D. Power found a strong positive relationship between customer commitment levels and the number of revenue-generating products a customer utilizes. In other words, the more frequent the interactions with the bank for different products or services, the more committed and loyal the customer is. Also, these customers tend to recommend their bank more often.

As far as ATM usage is concerned, the number of terminals continues to increase, with rapid growth in both the U.S. and in Canada. There appears to be a push to increase the growth of off-premise ATM's by using wireless telecom connections as opposed to land lines. This will not only reduce deployment and maintenance costs, but make installation simple and—most importantly—reduce transaction times.

A credit union is a financial cooperative organization of individuals with a common affiliation such as employment, labour union membership or place of residence. The organization is typically a non-profit corporation owned and operated by its members. Credit unions offer similar products and services to those provided by a bank's retail arm, including accepting deposits and providing credit card and loan facilities. The offering is not as broad as that of the banks and the customer base is limited to membership in the credit union. Trends in the credit union business are similar to those in banking and focus on increasing automation while maintaining customer satisfaction. Credit unions continue to expand their product offering including mortgage lending and credit cards. Some have also relaxed membership requirements in an effort to attract more members.

Savings and loans, also called Thrifts, are a type of depository financial institution found in the United States. An S & L accepts deposits from consumers and holds the majority of its assets in home mortgages. They are often mutually held (often called mutual savings banks), meaning the depositors and borrowers are members with voting rights and have the ability to direct the managerial goals of the organization. In some cases a savings and loan can issue stock and be publicly traded and members no longer have direct managerial control. Today, S & L's are virtually indistinguishable from banks in their product offerings and some even call themselves banks. One key difference is the S & L's focus on marketing themselves as community-oriented, home-lending specialists. Beyond this, automation and other trends are similar to those in the banking industry.

A trust company is either a type of commercial bank or a division of a bank, which specializes in being a trustee of various kinds of trusts and managing estates. Historically, trust companies had to be operated as stand-alone companies, separate from banks or other companies. Since this is no longer required, trust companies are usually divisions of a bank or other financial institution that provides the services associated with the original trust companies. Modern-day trust companies act as trustees—someone who administers financial assets on behalf of another. A trustee will manage investments, keep records, manage assets and prepare court accounting, pay bills and distribute income and principal as stipulated in the individual trust agreement. In some countries, like Canada, trust companies can also offer day-to-day banking services to consumers. Although independent, trust companies offer many bank-like services, the nature of trust agreement work usually requires personal interaction. These companies are therefore limited in how much automation they can incorporate.

Money transmitters are specialized deposit institutions that focus on sending or transmitting money to other locations. While other services may be provided, the typical transmitter accepts a deposit at a local office and charges a fee for delivering the equivalent amount in local currency to a location of the depositor's choice. Transmitter companies are usually corporations and may be owned by large financial institutions like AMERICAN EXPRESS™ or WESTERN UNION™. Like bank branches, money transmitters' locations are also numerous. They typically serve the needs of expatriates and/or immigrant workers who remit money back home. In the U.S. and Canada, there are, for example, many migrant farm workers who remit money regularly to their homes in Mexico, Central America or elsewhere. The practice is quite prevalent throughout the world, and in some countries remittances from citizens working abroad is one of the single largest sources of foreign exchange. Countries like India, Pakistan, the Philippines, Bangladesh, etc. supply large parts of the labour pool in oil-wealthy middle-eastern countries. Because of this, money transmitter offices are quite large in numbers. The money transmitting business, although considered a depository business, is quite different from banking. First of all, it is largely a cash business with depositors bringing cash in to be transmitted elsewhere. This makes it more difficult to use ATM's or other forms of automation. However, there are security issues associated with the handling of cash that would likely benefit from remote signing and interaction. In addition, remote interaction would serve as instant confirmation that the money has been received.

The securities industry raises capital for businesses and governments, sells and trades securities, and provides investment advice. Firms that act as securities agents and investment dealers buy and sell stocks, bonds, treasury bills, mutual funds and other securities for individual investors, pension fund managers, banks, trust companies, insurance firms and other establishments. Brokerage firms buy and sell stocks, bonds, commodity futures, foreign currencies and other securities at stock and other exchanges on behalf of investment dealers. In addition to buying and selling according to prescribed regulations, agents and dealers provide information to, and develop relationships with, clients. Brokers, on the other hand, perform similar duties but work directly with investment dealers as opposed to the ultimate clients. Investment advisors typically focus on providing financial planning and advice and may not get directly involved in trading activities.

There are three main categories of firms that make up the securities industry:

(1) Retail: Retail firms include full-service firms and discount brokers. Full-service firms offer a wide variety of products and services for the retail (individual) investor including: research and advice; buying and selling and; monitoring and reporting. Discount brokers execute trades over the telephone and over the Internet for clients at reduced rates, but generally do not provide advice. They are popular with more knowledgeable clients who are willing to research companies themselves in exchange for lower commissions.

(2) Institutional: These firms specialize in serving institutional clients such as pension funds, insurance companies and other investment firms.

(3) Integrated: These firms offer products and services that cover all aspects of the industry, including full participation in both the institutional and retail markets. These are typically very large firms and they provide investment advice as well as trading and management services. Some of the largest of these firms are owned by, or affiliated with, major banking institutions.

Like commercial bank branches, securities firms often have extensive branch networks. These networks are particularly large in the more developed economies of the U.S., Canada, Western Europe and Japan.

Paralleling the depository institutions, key trends in the securities industry are the result of increased automation and globalization. The trends summarized here refer to the U.S. market, but are applicable to Canada and other developed countries.

Cross-border trading refers to the increasing willingness of investors in one country to invest in the securities of another. Cross-border trading has increased substantially in recent years, resulting from both automation and the broader availability of investment vehicles and information.

Along with this, on-line trading (trading securities via the Internet) continues to attract a significant number of investors from around the world.

It should be understood that in this disclosure "financial institutions" refers collectively to all types of financial institutions such as the various financial institutions referred to above, including various types of banks, depository institutions, securities institutions, investment institutions, trust companies, money transmitters, credit unions and so on, as well as similar organizations existing or to be conceived.

Financial Transactions

The following transactions are relevant to commercial banks and also to credit unions and S & L's, which offer many of the same services as banks. These transactions may take place at the branch, on-line, at ATM's, or by telephone, as applicable and/or feasible. This list is not exhaustive.

(1) Account management (savings, chequing, other): including opening an account, closing an account, depositing funds, withdrawing funds, cashing cheques, transferring funds between accounts, and obtaining account balances.

(2) Making payments (utility bills, taxes, credit card bills, other): via debit card, credit card, direct debit, personal or business cheques, certified cheques, in cash, and wire transfer.

(3) Credit arrangements/applications: including overdraft, line of credit, personal loan, vehicle loan, mortgages, applying for credit or debit card, and increasing credit card limit.

(4) Investment management (deposits, withdrawals, trades, etc.): including certificates of deposit or guaranteed investment certificates, mutual funds, retirement accounts—deposits/withdrawals, and other investment vehicles.

(5) Special requests: including ordering cheques, replacing a credit or debit card, cancelling a credit or debit card, stopping payment on a cheque, regularly scheduled transfers or deposits, question billings or statements, and general inquiries.

(6) Other products (purchase, sell, other): including new home, auto, life insurance, change terms of existing insurance, creating or altering trust agreements.

The following transactions are relevant to central banks. This list is not exhaustive.

(1) Currency issue and management: including relaying information to design or printing firms, distributing currency to commercial banks, and taking old currency out of circulation.

(2) Investment management: including issuing and selling treasury bills, bonds and other securities, purchasing and selling foreign currency reserves, purchasing and selling gold and other reserves, purchasing and selling securities to manage liquidity, lending funds to commercial banks, and investing surplus funds in term deposits.

The following transactions are relevant to supranational institutions. This list is also not exhaustive.

(1) Credit arrangements/applications: including accepting/reviewing applications from member governments, depositing approved loans at designated institutions, altering the terms of a loan/credit agreement, receiving payments of principal and/or interest, and purchasing and selling gold, foreign currency and other reserves.

(2) Performance agreements (on inflation, exchange rates, etc.): including reviewing and executing agreements with member governments, altering terms of existing agreements and terminating agreements.

The following transactions are relevant to money transmitters. This list is not exhaustive.

(1) Accepting deposits: including in cash, by debit card (on line, in person or by phone), by credit card (on line, in person or by phone), bank draft or certified cheque or otherwise.

(2) Agreement interaction: including filling out transfer applications, monitoring transfer/order status, and questioning fees, transfer times, or otherwise.

Retail securities, as with retail banking, generally require that the transactions be conducted in person, over the telephone, or via the Internet where there is some means of authentication. The following transactions are relevant to retail securities. This list is not exhaustive.

(1) Account management: including opening an account, closing an account, obtaining account balances, reviewing holdings, deposit funds, withdrawing funds, and applying for credit or margin.

(2) Trading: including placing sell orders, placing buy orders, reviewing order status, reviewing commission structure, reviewing settlement dates, and obtaining quotations.

(3) Advisory services: including requesting research and/or reports, specific inquiries about a company, requesting buy/sell recommendations, reviewing portfolio, and reviewing investment strategy.

For institutional securities and brokers, there are often transactions between the securities firm and other institutions, for example an investment firm or pension fund. The relevant transactions are as follows, with the list not being exhaustive.

(1) Account management: including opening an account, closing an account, reviewing holdings and balances, deposit funds, and withdrawing funds.

(2) Trading: including placing sell orders, placing buy orders, reviewing and monitoring order status, and regularly scheduled sales or purchases.

(3) Advisory services: including reviewing portfolio, reviewing investment strategy, requesting research and/or reports, requesting/providing buy/sell recommendations, requesting tax advice, and recommending other advisory services.

There are therefore many types of transactions that take place between financial institutions and their customers or affiliates. It should be understood that in this disclosure "financial transactions" refers collectively to the various types of transactions engaged in by financial institutions including the ones referenced above, as well as other similar transactions, whether existing or to be conceived.

When one considers the thousands of individual financial institutions around the world, and the millions of customers, the number of financial transactions being executed becomes mind boggling. While automation has made some of these transactions easier and quicker to execute (e.g. via the Internet or at ATM's), there are still many others that still require either personal contact and/or a personal signature.

Financial institutions have generally required proof of identification to avoid fraud. Historically, the main vehicle for authentication had been a valid signature. This requirement was gradually relaxed with the advent of credit cards and electronic transactions which rely on Personal Identification Numbers (PIN's), and other information, as part of the authentication process. Processes based on PIN's, however, have been susceptible to various forms of security attacks.

Also, during this time stricter identification requirements seem to have developed. For example, there seems to be closer scrutiny of passports and visas as we travel. Airlines require more proof and so do cruise lines and others in the travel industry. Individuals who traditionally used their middle names have had to revert to their first names lest their identity be confused.

In the U.S., the Real ID Act (passed in 2005) makes it more difficult for illegal immigrants to obtain identification that the federal government would recognize when they try to board a plane, fill out tax forms or open a bank account. The measure affects U.S. citizens as well and requirements for acquiring drivers' licenses are much tighter. The country continues to move closer to universal I.D. requirements common elsewhere and everywhere we go we are asked for "picture ID" or "two pieces of ID".

As the need for proof of identity increases so does the requirement for signatures as a proven authentication vehicle. For example, U.S. States now have extensive identification requirements for acquiring drivers' licenses and they list the type of documents they will accept. They usually require at least two types of ID documents and one of the supporting types or secondary documents must have the individual's name and signature.

In addition to a potential authentication deficiency, most of today's more automated transactions suffer from a lack of direct interaction between supplier and client and can be very impersonal experiences. We have all experienced frustration at not being able to "talk to a real person" when we encounter problems filling out an on-line form or at the ATM.

There is therefore a need to automate the many transactions that currently require in-person contact while enhancing the customer service interaction for the benefit of suppliers and customers. There is also a need to provide this automation of transactions in a way that permits an advantageous level of authentication, and that is easy to adopt.

Legal Transactions

Another example of an area where there is a need for a solution for signing documents in multiple locations is in the context of legal transactions involving documents, such as legal agreements requiring signatures by multiple parties, at least some of whom are in different locations. It is quite common to negotiate legal agreements between parties in different locations and then have to organize obtaining the various signatures of the multiple parties. Often a single party has multiple signing authorities, and such signing authorities may be dispersed geographically at the time their signature is required. Sometimes this is addressed using fax counterparts with the disadvantage described below. Electronic signing technologies involving Public Key Infrastructure, for example, are cumbersome as it is quite likely that at least one of the signatories has not signed up or does not have access to their key store at the time signature is required. For these and other reasons, despite advancements in technology, the preferred method is still to organize closing meetings where the various signing representatives assemble in a single location in order to facilitate the collection of original signatures of all of the signing representatives at one time and in one place. The closing meeting provides satisfactory authentication of the documents in that original signatures are obtained from individuals attending the closing meeting such that other signing representatives or witnesses can attest to the fact that the signing representatives were in attendance and had signed particular document. Alternatively, arrangements are made to circulate original copies of agreements one by one until other signatories in different locations have affixed their signature. This is less desirably from an authentication perspective. Either of these solutions is time consuming, relatively resource intensive. The closing meeting in particular carries significant cost when one considers travel time, travel expenses, as well as the loss in efficiency of the signing representatives who are not normally and their normal output levels even if they are not directly engaged by the transaction negotiations or the closing meeting, because of the distractions involved in the group setting for example.

Existing Solutions for Authentication Using Signature

One of the major impediments preventing the automation of many transactions is the need for a legally valid signature. In-person signatures are still typically required for loans, new accounts, contracts, etc.

Faxes are still used by many companies for order processing and are also an accepted way to convey a signature for contracts such as real estate purchases or sales. Also, there are always contracts that require an actual signed document or that will only accept a faxed signature if it is notarized. Even if faxed signatures were to become acceptable in all cases, they have a major drawback in that the signature could be a forgery. Accordingly, in many cases signature using fax counterparts does not provide a desirable level authentication. In addition, while faxes may solve the signature requirement, they do not help enhance the customer service interaction.

While this disclosure refers for the most part to "signatures" it should also be understood that other forms of handwriting including initials or handwritten modifications to contracts present similar issues as do signatures, and which are addressed by the present solution. "Signatures" should not therefore be read in a limitative sense.

Electronic or digital signatures are gradually becoming more acceptable. A signature can be scanned into a computer and then sent via the Internet. Alternatively, the whole contract and signature can be scanned and e-mailed. Infrastructures based on the use of unique digital signatures such as Public Key Infrastructures ("PKI") are well known. The use of electronic signatures offers speed advantages over faxing, however, this method can still allow forgeries and does not resolve the customer interaction problem. Also, there are problems with the adoption of systems based on digital signatures because they generally require a relatively significant departure from established practices for engaging in financial transactions.

A video conference between the two parties to a contract or transaction is a means for authentication. For example, one party could sign a contract in full view of the second party and then either fax or scan/e-mail the signed contract. The second party would then add his/her signature and send the duly executed document back. While this method is relatively speedy and appears effective, it still has authentication problems. There is no foolproof way of ensuring the signed document faxed or e-mailed is the same one you saw during the video conference.

An issue related to authentication is non-repudiation. One of the requirements of financial institutions is that financial transactions entered into remotely enable the financial institution to evidence that the actual person named in a financial transaction "accepted" the terms and conditions thereof, so that the actual person cannot repudiate the financial transaction. Currently, handwriting is generally used for the purposes of non-repudiation (or in some cases a handwritten initial or hand, but the problems concerning authentication identified above also affect non-repudiation.

Existing Solutions for Customer Service Interaction

Enhancing, or even allowing for, interaction between a customer and the financial institution should lead to increased customer satisfaction and sales. There are several ways that this is currently accomplished.

Increased use of customer service staff accessible via toll-free numbers would satisfy many customer concerns and answer questions when required. This is, however, a costly solution for the institution. It also tends to be somewhat impersonal and does not resolve a signature or handwriting issue that may be present.

As mentioned above, video conferencing can partially solve signature requirements. It also would allow more personal and satisfying interaction as the customer can see the person he/she is talking to. Video conferencing can, of course, be costly and it does not provide a fully-integrated solution to the twin challenges of signature requirement and enhanced interaction.

Webcam communication is another option. A webcam is a camera that records live action—much like a video camera. It attaches to a computer and can upload images and audio onto the Internet so they can be received by a second webcam-equipped computer. Webcams provide a form of video conferencing and could allow customer-institution interaction at, usually, a much lower cost than true video conferencing. The two major drawbacks of webcams are that the quality of the images can be unreliable and the lack of security. The feed from a webcam can be accessible to webcam-equipped computers other than the intended recipient. In addition, webcams do not provide an integrated solution for the signature requirement.

Finally, an increased number of branches would provide the requisite customer service interaction. If customers had access to many more branches that were fully staffed and open 24/7, this would be a much better solution. A customer would simply drop into a branch very close by, there would be minimal waiting and he/she would execute the required transactions while talking to a knowledgeable, "real" person. Needless to say, this solution would be prohibitively expensive for the institutions. It would reverse a long-term trend towards automation and branch reduction and drastically reduce the return on the huge investment in electronic equipment. It would also require a large investment in staffing and training.

Based on foregoing, there is a need for means for conducting transactions on a remote basis with effective means for authentication and non-repudiation while providing interaction between a user and a financial institution.

SUMMARY OF THE INVENTION

In one aspect of the present invention, a method for enabling entry into transactions remotely, is provided wherein a first computer is provided at a first location of one or more parties to a transaction, and a second computer is provided at a second location of one or more other parties to the transaction, the first computer and the second computer being linked so as to provide communication therebetween, characterized by:
(a) either the first computer, the second computer, or both of the first computer and the second computer initiating a request to authenticate one or more of the parties, a document associated with the transaction, and/or the transaction;
(b) in response to the request(s) to authenticate, one or more of the parties providing a signature or other handwriting as input to the first computer or the second computer at their location by operation of an input device linked to such first computer or second computer; and
(c) transmitting the signature or other handwriting from the first computer or the second computer to the other of the first computer or second computer, or to a central authentication server, and associating the signature or other handwriting, along with optionally other data elements, with the document, so as to authenticate one or more of the parties, the document, or the transaction.

In another aspect of the present invention, a system for enabling entry into transactions remotely, is provided characterized in that the system includes:
(a) a first computer is provided at a first location of one or more parties to a transaction, the first computer being linked to a second computer provided at a second location of one or more other parties to the transaction, the first computer and the second computer being operable to permit communication therebetween;
 (i) the first computer being linked to or including an authentication utility that is operable to initiate a request to authenticate one or more of the parties, a document associated with the transaction, and/or the transaction, or to act on such a request received from the second computer or from a central authentication server;
 (ii) the authentication utility being linked to or incorporating a writing utility that enables, in response to the request(s) to authenticate, one or more of the parties to provide a signature or other handwriting as input to the first computer;
the first computer being operable to transmit the signature or other handwriting from the first computer or the second computer to the other of the first computer or second computer, or to a central authentication server, and associating the signature or other handwriting, along with optionally other data elements, with the document, so as to authenticate one or more of the parties, the document, or the transaction.

In yet another aspect of the present invention, a computer program is provided including computer instructions executable by a computer, the computer program characterized in that:
(a) the computer program includes an authentication utility that is operable to initiate a request to authenticate one or more of parties associated with a transaction, a document associated with the transaction, and/or the transaction, or to act on such a request received from the second computer or from a central authentication server;
(b) the authentication utility is linked to or incorporates a writing utility that enables, in response to the request(s) to authenticate, one or more of the parties to provide a signature or other handwriting as input to the first computer; and
(c) the computer program being operable to transmit the signature or other handwriting from the first computer to a second computer, or to a central authentication server, and associating the signature or other handwriting, along with optionally other data elements, with the document, so as to authenticate one or more of the parties, the document, or the transaction.

BRIEF DESCRIPTION OF THE DRAWINGS

A detailed description of the preferred embodiment(s) is (are) provided herein below by way of example only and with reference to the following drawings, in which.

Figure 1:
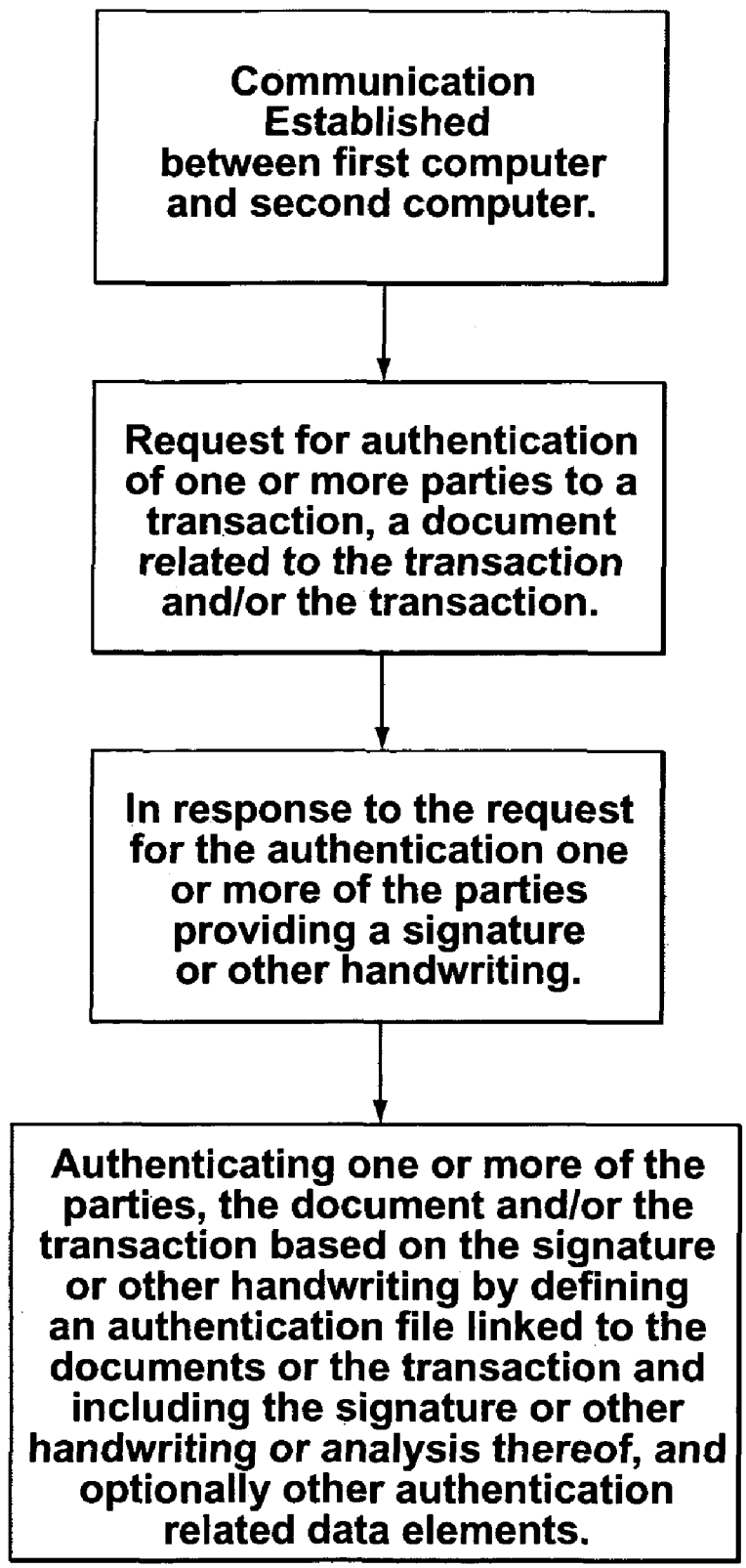
FIG. 1 is a flowchart illustrating the method of the present invention in connection with the entry into a transaction.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

Note that the term "LONG PEN™", is used in the following description for a system, method and computer program in accordance with the present invention.

A system, method and computer program for enabling transactions on a remote basis is provided.

A system, method and computer program for enabling entry into transactions on a remote basis is provided. In one aspect of the present invention, a system, method and computer program is provided that includes: (1) a video conferencing system that enables authentication of the identity of at least one individual entering into a transaction; and (2) a remote signing device that enables at least one individual to indicate acceptance and provide authentication of the transaction by signing a document (whether a paper based document or a digital document) on a remote basis. As a further aspect of the present invention, the video conferencing system also enables audio-video interaction between at least a first party, or its agent, and at least a second party, or its agent, at a second location. As a particular aspect of the present invention, the system of the present invention creates an audio-video recording of the interaction, or part of the interaction, between the first party and the second party. The audio-video recording forms part of an electronic audit file that is stored on at least one storage medium and is retrievable to authenticate the transaction. The method of the present invention is illustrated in FIG. 1.

One aspect of the present invention is the generation of an "authentication file", also referred to as an audit file or master file, for the transaction. The purpose of the authentication file is to authenticate and provide audit capabilities to all parties. In one particular embodiment of the present invention, the master file is a set of linkages to other files which provides authenticity of the component files referenced by the master file. These references are maintained by "hash" codes and encryption. The master file references any number of audit files that may include (1) an audio/visual transaction record; (2) one or more images of one or more signed documents related to the transaction (this could be an image of the entire document, or an image only of parts of a document that have been edited including by affixing handwriting or a signature thereto, it could also include an image of just a signing page); (3) biometric confirmation for authentic identification of participant(s); (4) date and time stamps; (5) serial numbers and/or IP addresses of the hardware used during the transaction (e.g. IP address for the first computer and the second computer, and optionally the central authentication server); (6) codes to allow viewing but not modification of specific components that relate to the transaction.

The authentication file may also include: (A) identification data for the one or more parties such as their username/password data, or the fact that a successful login using this data was processed; (B) one or more audio or video images related to the transaction for authentication purposes (video images of one or more parties, for example, could be compared to images on file to establish identity); or (C) analytical data established for the handwriting based on authentication analysis thereof. Regarding (C) it should be understood that the present invention includes an authentication utility (not shown) (linked to the first computer, the second computer or the central authentication server) that is operable to analyze the handwriting data captured in accordance with the present invention, using various means know to those skilled in the art of digital analysis of handwriting. In one particular embodiment of the present invention, the authentication utility is part of a server application that is linked to the central authentication server and the authentication utility incorporates one or more handwriting analysis routines for analyzing the digital pen path recorded for a particular instance of handwriting associated with the handwriting or signature captured in accordance with the invention, and this digital pen path is compared against previous digital pen paths for other instances of handwriting or signature stored to a memory associated with the central authentication server, and made accessible to the authentication utility for authentication purposes. Upon confirmation of the identity of one or more parties, the authentication utility is operable to issue a certificate that confirms the identity of the one or more parties to the first computer, the second computer, and/or to the central authentication server itself. This certificate can be applied to the document electronically in accordance with prior art methodologies, for example, by affixing a digital seal to the document that confirms authentication.

In one particular implementation of the present invention, the authentication file may be a coded file that when opened will retrieve files associated with the authentication file and optionally will execute a program to extract the information that serves to authenticate the transaction. Each participant's master file is protected by password protection or other authentication methods. The master file is present when a transaction has taken place with a hard copy execution or not thereby allowing for authenticity of identification associated with both a hard copy and a soft copy of the document.

In one particular aspect of the invention, the first computer is linked to or incorporates a digital pen to capture the handwriting or signature of one or more parties. The second computer may also optionally incorporated or be linked to a digital pen.

In another particular aspect of the invention, the second computer is linked to or incorporates a writing utility that is operable to reproduce on a paper document (whether a signature page, a financial document, a legal agreement or otherwise) the handwriting or signature captured by operation of the first computer, provided that the one or more parties providing such handwriting or signature have been authenticated as described above.

The system of the present invention, in one particular embodiment thereof, also creates a paper based document bearing the signature or other handwriting of at least one individual that is linked to the transaction and the corresponding audit file. The audit file and signed paper based document provide means for authenticating the transaction to at least one individual, within the first party (e.g. a financial institution), and also to third parties (for example another party to the transactions (such as for example another financial institution whose participation is required in a financial transaction related to the particular financial transaction).

Figure 2:
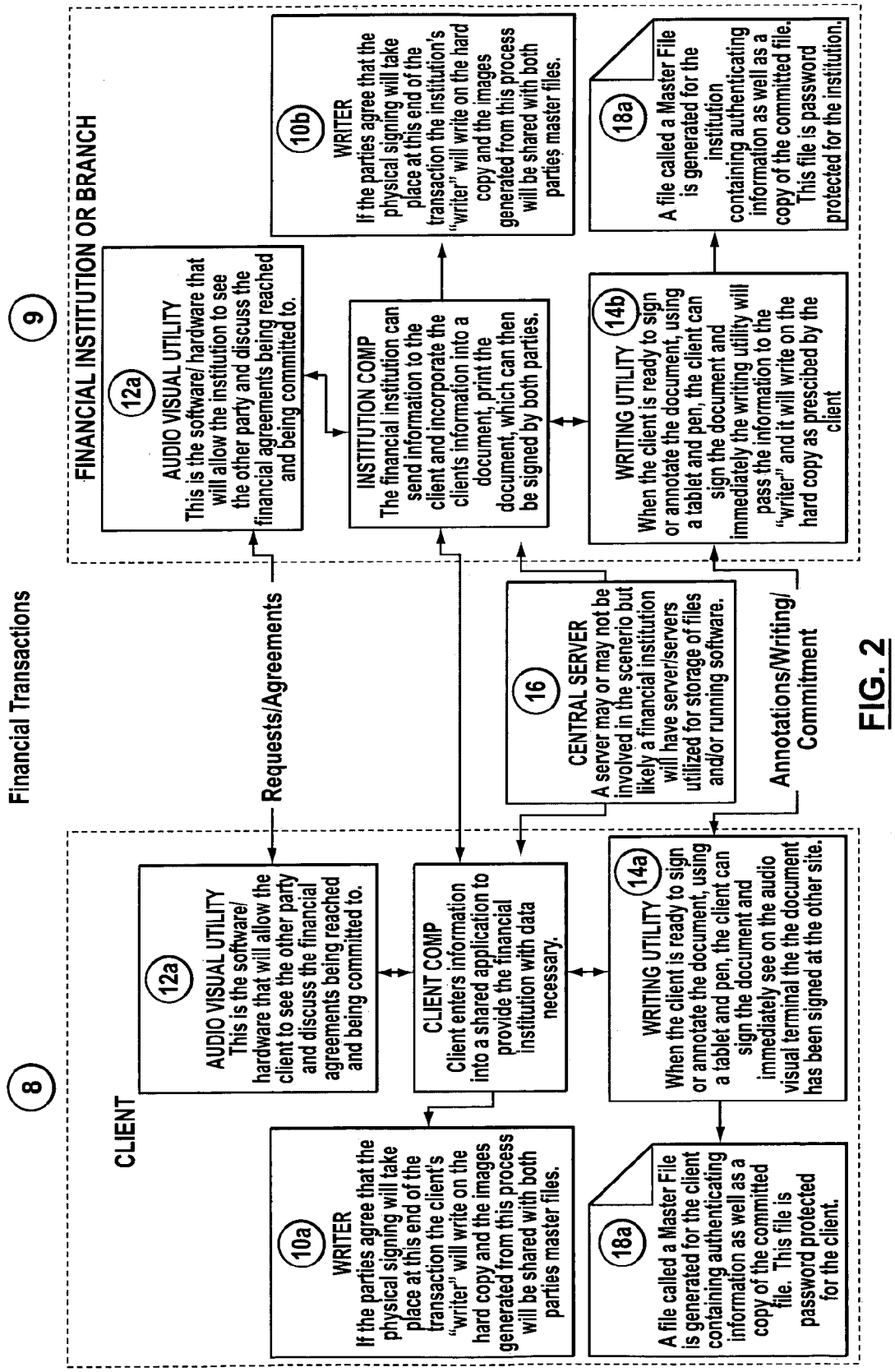
FIG. 2 is a flowchart illustrating the method of the present invention in connection with a transaction that is a financial transaction.

In one particular embodiment of the present invention, a customer is located at a first location (or "customer's location"), and a financial institution is located at a second location remote from the first (or "institution location"), with the customer and financial institution wanting to enter into a transaction. The system includes a two-way audiovisual communication system that enables interaction between the customer and the financial institution via a network, by operation of computer devices located at each of the customer's location (first computer) and the institution location (second computer). The system may also include a plotting device connected to the second computer that is operable to mark one or more documents with the customer's signature or other handwriting. It should be understood that the present invention contemplates the use of any plotting apparatus, including the plotting apparati set out in International Application No. PCT/CA2005/001788. The application of the present invention to a financial transaction is illustrated in FIG. 2.

Figure 3:
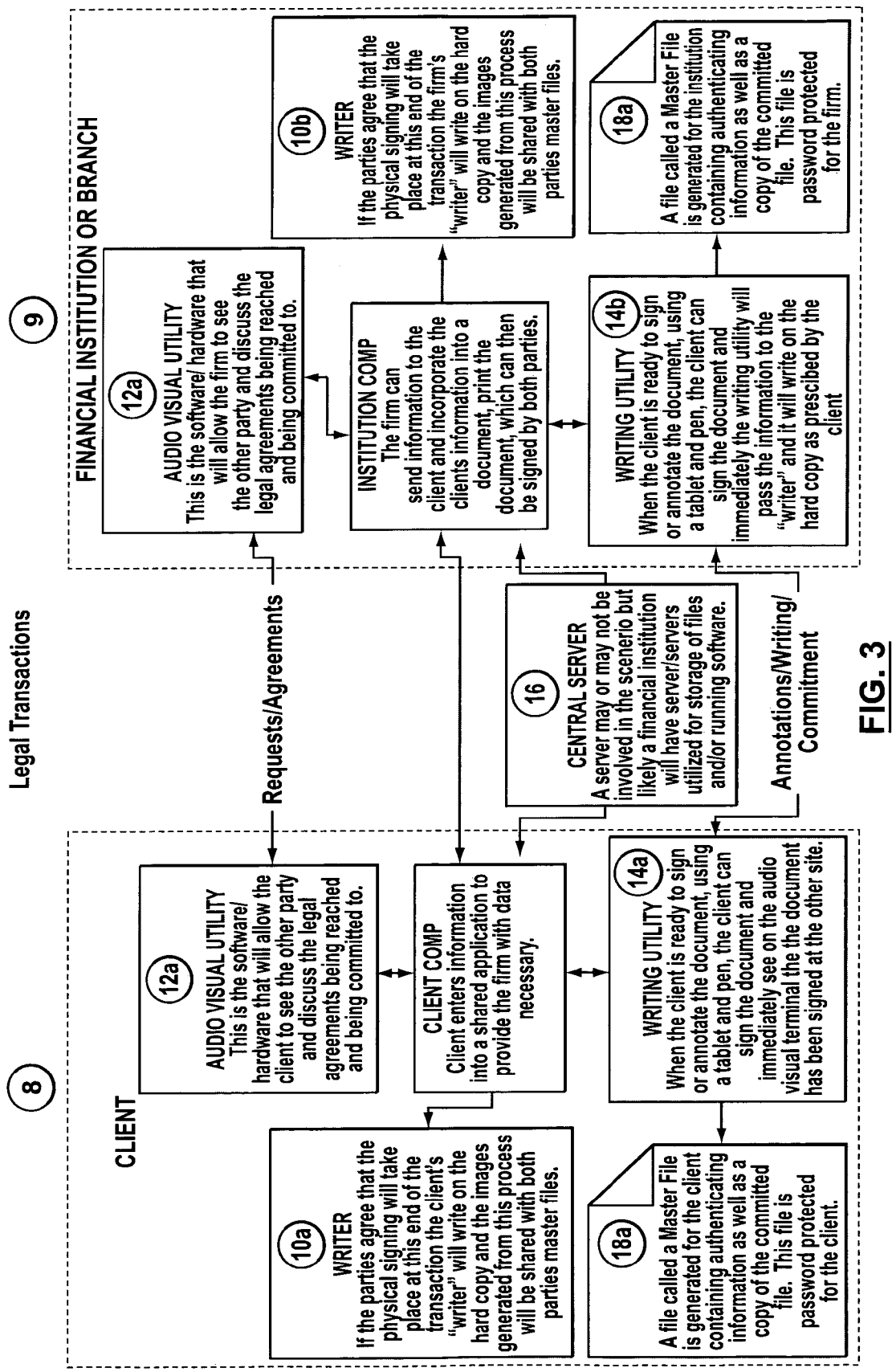
FIG. 3 is a flowchart illustrating the method of the present invention in connection with a transaction that is a legal transaction, in this case the acceptance of a legal agreement by multiple parties.

In another particular embodiment of the present invention, one or more signing representatives for a first intended party to a transaction are located at one or more locations (referred to for convenience as a "first location") and one or two signing representatives for a seconded intended party to the transaction are located at one or more locations remote from at least one or more of the locations of the signing representatives for the first intended party (referred to for convenience as the "second location"). The system includes an audiovisual communication system that enables interaction between the first intended party and the second intended party via a network, by operation of computer devices located at each of the first location and the second location. The system may also include a plotting device connected to a computer at each of the first location and the second location that is operable to mark one or more documents with the customer's signature or other handwriting. This aspect of the present invention is shown in FIG. 3.

An input device is connected to the first computer. The first computer is operable to permit the customer to provide a signature as an input to the input device connected to the first computer. The signature or other handwriting is sent from the first computer to the second computer, by operation of a communication facility connected to the first computer. The second computer is operable to receive the signature or other handwriting, and forward same to the plotting device. The plotting device is operable to receive the signature or other handwriting and, based on such signature or other handwriting, create a reproduction thereof, thereby providing a means of transaction authentication and non-repudiation. The two-way audiovisual communication system enables interaction between a first party and a second party to a transaction and provides a further means of transaction authentication and non-repudiation.

Figure 4:
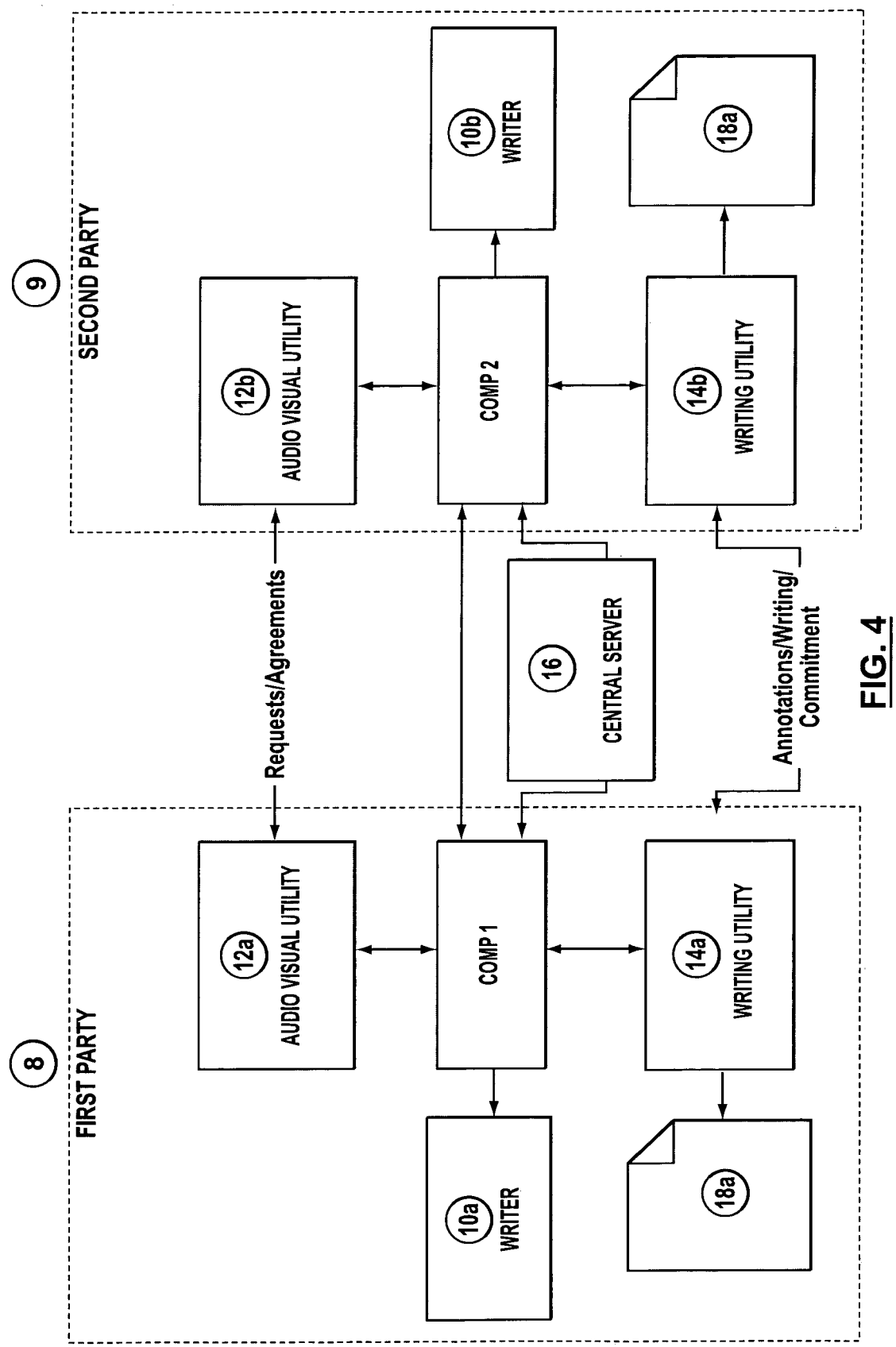
FIG. 4 is a system diagram illustrating one embodiment of the system of the present invention.

FIG. 4 illustrates one embodiment of the system of the present invention including: (1) the resources associated with a first party (8), (2) the resources associated with the second party (9), (3) the first computer and second computer, (4) the optional central server (16), (5) a writer or writing utility (10*a*) (10*b*) which may include a digital pen as explained above at the first computer and a writing device such as a plotter or other writing/signing device at the second computer, (6) a writing utility (14*a*) (14*b*) which is best understood as a software utility that is operable to capture and analyze handwriting (including signatures), and also to enable the annotation and editing of documents, and to associated such handwriting and editing with documents; the writing utility also incorporates the authentication utility in one aspect of the present invention such that the master file (18*a*) (18*b*) referred to above is generated for authentication purposes as set out above.

Figure 5:
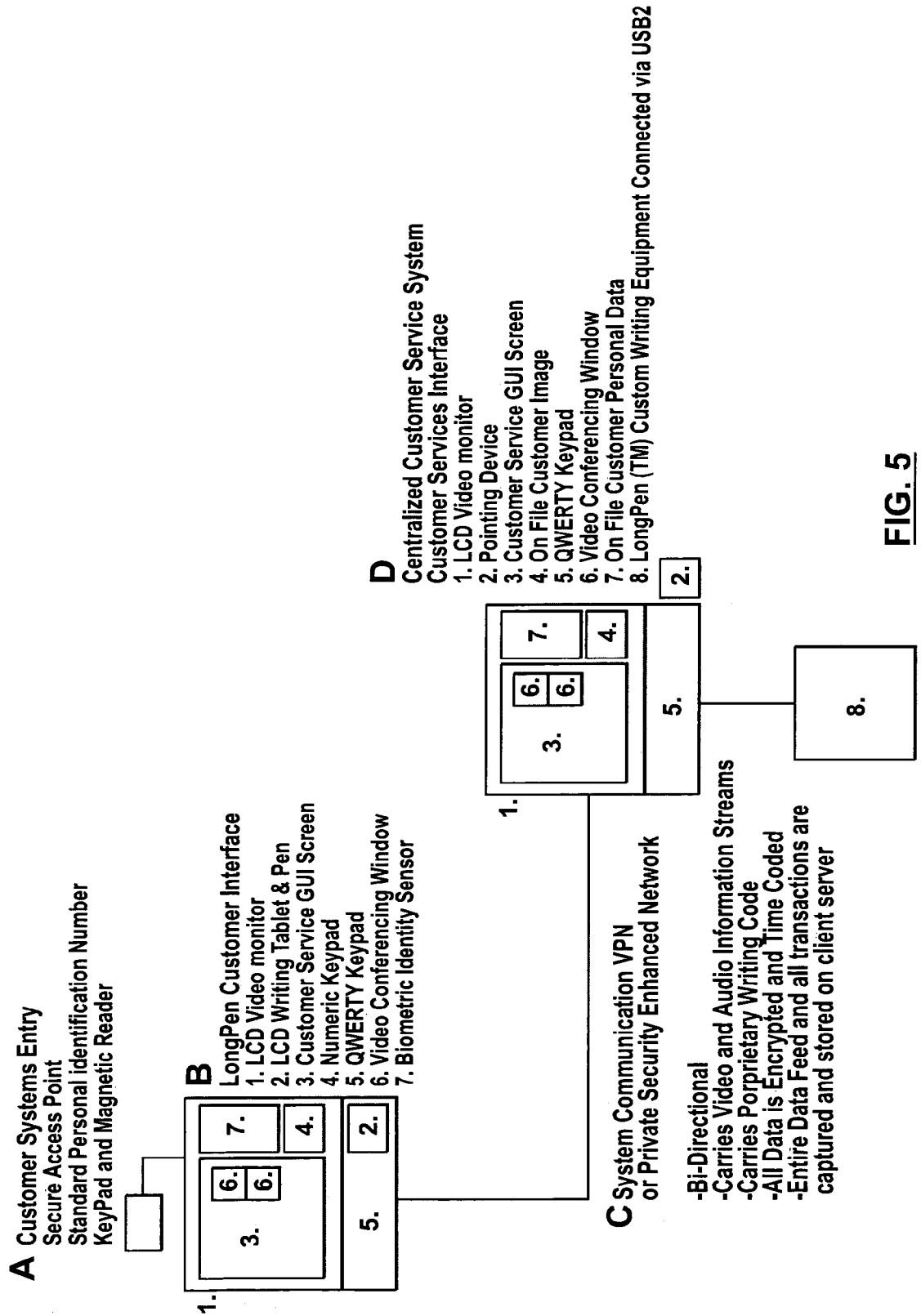
FIG. 5 illustrates an ATM banking application embodiment of the present invention.
Figure 6:
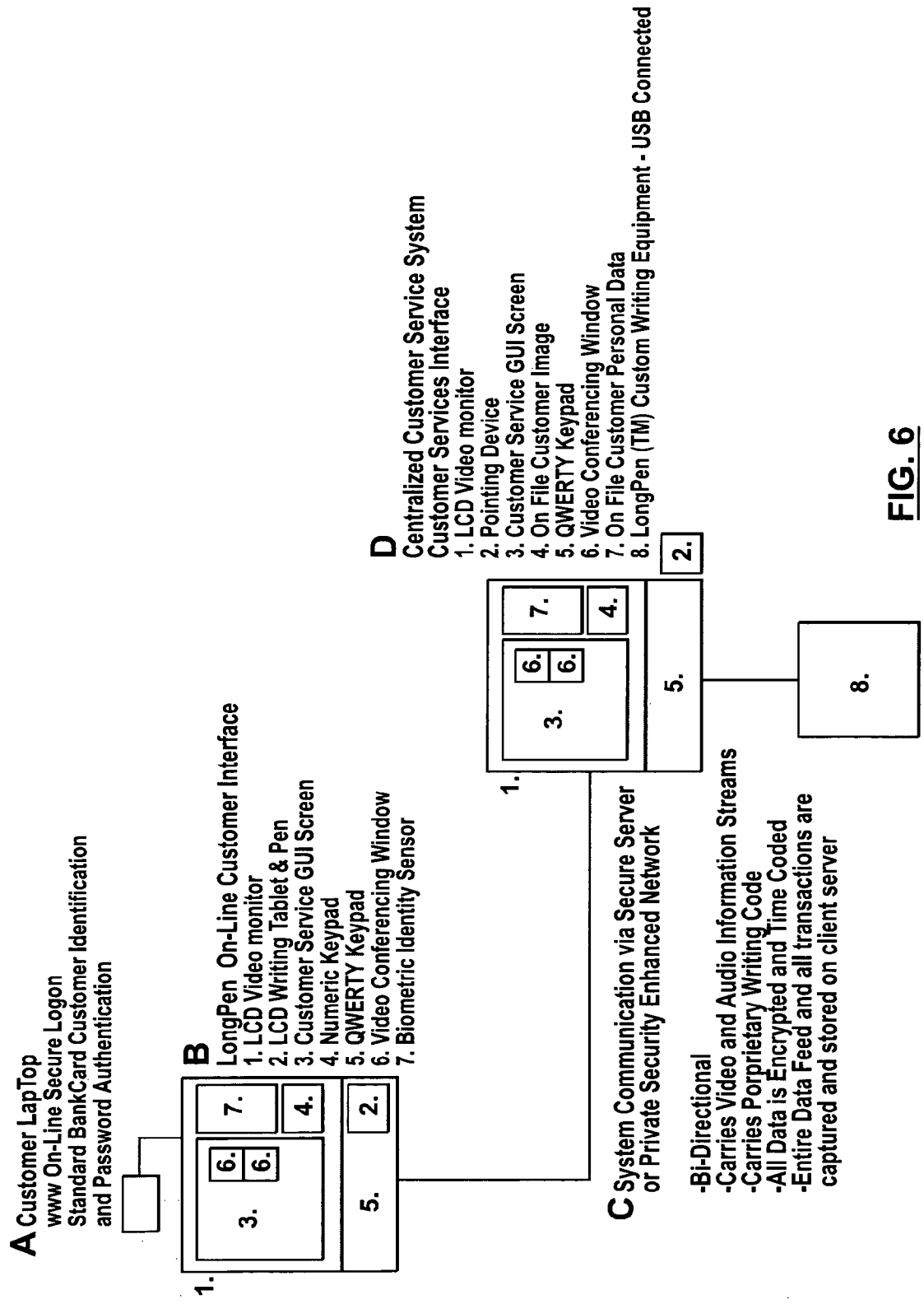
FIG. 6 illustrates a mobile banking application embodiment of the present invention.

In a particular embodiment of the present invention, a system, method and computer program is provided for enabling financial transactions on a remote basis wherein a customer is located at a branch of a financial institution (or "branch location"), and a financial institution is located at a second location remote from the branch location (or "institution location"), with the customer and financial institution wanting to enter into a transaction. A first computer at the branch location is operable to communicate with a second computer at the institution location as described above. This system also includes a two-way audiovisual communication system that enables interaction between the customer and the financial institution via a network, by operation of computer devices located at each of the branch location (first computer) and the institution location (second computer). Preferably, the system is enabled at the branch location using an ATM or similar device. This particular aspect of the present invention is illustrated in FIG. 5.

The method of the present invention comprises the steps of: (1) providing a first computer at a first location of one or more parties to a transaction, and providing a second computer at a second location of one or more other parties to the transaction, the first computer and the second computer being linked so as to provide communication therebetween; (2) either the first computer, the second computer, or both of the first computer and the second computer initiating a request to authenticate one or more of the parties and/or the transaction; (3) in response to the request(s) to authenticate, one or more of the parties providing a signature or other handwriting as input to the first computer or second computer at their location by operation of an input device linked to such first computer or second computer; (5) transmitting the signature or other handwriting from the first computer or the second computer to the other of the first computer or second computer, or to a central authentication server, and associating the signature or other handwriting, along with optionally other data elements, with a document associated with the transaction, so as to authenticate one or more of the parties, the document, or the transaction.

In a particular aspect of the present invention, the first computer and the second computer are linked to provide two-way audiovisual communication therebetween.

In a particular aspect of the present invention, the first computer and/or the second computer are operable to include as data elements for authentication of one or more of the parties, the document, or the transaction, data elements from the audiovisual communication.

In accordance with a particular aspect of the present invention, the other of the first computer or the second computer is linked to a plotting device, and the plotting device is operable to apply the signature or other handwriting to the document.

The computer program of the present invention, in one aspect thereof, is best understood as a computer application or computer applications that when loaded on the first computer and the second computer are operable to facilitate the interactive method described above.

In one particular embodiment of the present invention, a system, method and computer program for enabling financial transactions on a remote basis is provided. In accordance with this embodiment, a customer is located at a first location (or "customer's location"), and a financial institution is located at a second location remote from the first (or "institution location"), with the customer and financial institution wanting to enter into a transaction. The system includes a two-way audiovisual communication system that enables interaction between the customer and the financial institution via a network, by operation of computer devices located at each of the customer's location (first computer) and the institution location (second computer). The system also includes a plotting device connected to the second computer that is operable to mark one or more documents with the customer's signature or other handwriting.

The computer program is best understood as software utility that provides the functions of the writing utility (including the authentication utility) described above. One or more of the functions of the present invention can be provided by the central authentication server, in which case the computer program of the invention is a server program that incorporates these functions, including for example the capture of data elements associated with the master file, assembly of the master file, linking the master file to the applicable documents, managing queries regarding the authenticity of documents or transactions. The server program could also include reporting functionality, document storage and retrieval functionality, management of communications (including audiovisual conference scheduling, billing etc.) and many other functions and utilities known to those skilled in the art.

An input device may be connected to the first computer. The first computer may be operable to permit the customer to provide a signature or other handwriting as an input to the input device connected to the first computer. The signature or other handwriting may be sent from the first computer to the second computer, by operation of a communication facility connected to the first computer. The second computer may be operable to receive the signature or other handwriting, and forward same to the plotting device. The plotting device may be operable to receive the signature or other handwriting and, based on such signature or other handwriting, create a reproduction thereof, thereby providing a means of transaction authentication and non-repudiation. The two-way audiovisual communication system that enables interaction between the customer and the financial institution may provide a further means of transaction authentication and non-repudiation.

In an alternative embodiment of the present invention, a system, method and computer program for enabling financial transactions on a remote basis is provided wherein a customer is located at a branch of a financial institution (or "branch location"), and a financial institution is located at a second location remote from the branch location (or "institution location"), with the customer and financial institution wanting to enter into a transaction. A first computer at the branch location is operable to communicate with a second computer at the institution location as described above. This system may also include a two-way audiovisual communication system that enables interaction between the customer and the financial institution via a network, by operation of computer devices located at each of the branch location (first computer) and the institution location (second computer). The system may be enabled at the branch location using an ATM or similar device.

In another aspect of the present invention, the method comprises the steps of: (1) providing a first computer at a location of a first party, and providing a second computer at a location of a second party, the first computer and the second computer being linked so as to provide a two-way audiovisual communication system; (2) providing an authentication request associated with a transaction at the second computer and communicating the request to the first computer; (3) the first party reviewing the request and providing a signature or other handwriting as an input to an input device connected to the first computer; (5) transmitting the signature or other handwriting from the first computer to the second computer; (6) receiving the signature or other handwriting and providing the signature or other handwriting to a plotting device connected to the second computer; and (7) applying the signature or other handwriting to a transactional document, wherein the audiovisual information received by the second computer and the signature or other handwriting received by the second computer in combination provides means of transaction authentication and non-repudiation.

The computer program of the present invention, in one aspect thereof, is best understood as a computer application or computer applications that when loaded on the first computer and the second computer are operable to facilitate the interactive method described above.

In a particular implementation of the present invention where the first party is a customer and the second party is a financial institution in a commercial or retail bank setting, the present invention is advantageous in several regards. First, the unique ability to transfer handwriting such as signatures to a remote object allows customers to legally sign from their nearest branch office or ATM station equipped with the system. They could even fill out forms in their own handwriting. Secondly, the customer would be able to interact directly with the institution's customer service representative via the integrated bi-directional video-conferencing system. The customer would ask questions or clarifications and sign in full view of the customer service representative. Both parties would have a visual record of the interaction and signatures or other handwriting as a means for authentication and non-repudiation. In addition, there could be other authentication questions asked that would be captured in the video record, providing yet another layer of security. Over and above the video record, the present invention contemplates the capability to maintain a detailed audit trail of the interaction for further validation/authentication. In addition, the present invention contemplates inclusion of additional authentication means such as pin code/password access, biometric authentication and the like.

In one aspect of the present invention, a system may be installed at the office of a financial institution to allow remote customers to interact with and sign documents as required. This could include, for example: replacing lost or stolen debit or credit cards; executing contracts to purchase or sell real estate or other assets; opening or closing accounts; arranging large withdrawals or deposits; cheque certification; stopping payment on a cheque; making specific, branch-related inquiries; ordering cheques; applying for loans or making changes; arranging transfers between accounts; arranging specific payments; or interacting with and signing documents required at bank's head office.

In another aspect of the present invention, a kiosk such as an ATM for example is equipped with a system eliminating the need to be present at a branch for financial transactions that currently may require in-person signatures and/or interaction with customer service, for example such as: opening an account; closing an account; certifying a cheque; obtaining a bank draft; arranging a wire transfer; arranging or increasing an overdraft; arranging or increasing a line of credit; applying for a personal loan; applying for a vehicle loan; applying for a mortgage; applying for a credit or debit card; arranging replacement of a credit or debit card; cancelling a debit or credit card; stopping payment on a cheque; questions billings or statements; purchasing certificates of deposit or guaranteed investment certificates; arranging deposits or withdrawals from retirement accounts; purchasing or changing insurance; or creating or altering trust agreements.

Alternatively, the system in accordance with the present invention could be installed in a separate secure area within a branch office of the financial institution.

In addition to commercial/retail banking, the present invention would benefit a central bank, allowing it to interact and enter into binding arrangements with branch offices, bank note designers and printers, commercial banks head offices (borrowing from central bank), other central banks (loans, exchanges or reserves, etc.), or even supranational institutions.

Supranational institutions themselves would benefit from the present invention's interactive capabilities as they interact with central banks and finance ministries of member countries to accept and review applications for borrowing facilities, alter the terms of loan/credit agreements, review and execute performance agreements, deposit approved credits or receive payments, or terminate agreements.

Money transmitters could significantly enhance the service they provide by utilizing the present invention's remote capabilities installed at their locations around the world. The larger, multinational companies may start out with installations at key locations in each country or city and gradually expand this to all locations. The present invention would allow direct interactions between the sender and receiver to ensure transaction was successful, or interactions between staff at each location.

Like banks, securities firms could first install the system of the present invention at their head office and key branches before expanding to all branches. Transactions requiring in-person signatures and/or interaction would be enhanced, including opening or closing accounts, applying for credit or margin, transferring securities or funds between accounts, executing contracts or powers of attorney, obtaining advice from agents or advisors from a remote location, reviewing portfolio/investment strategy from a remote location, or inquiring about fees, billings, trades, etc. from remote locations.

With respect to institutional securities, the transactions between a securities firm and other institutions would also be enhanced, and would allow placing and reviewing large buy or sell orders, reviewing portfolio/investment strategies, reviewing tax strategies, executing contracts or agreements, or making changes to contracts or agreements, all on a remote basis.

In addition, transactions in the context of real estate could be greatly enhanced, allowing, among other things, the remote execution of transactional documents in accordance with the system and method discussed herein.

Some of the particular advantages of the present invention are as follows.

(1) Increased sales of products and services. The ability to interact with customer service representatives to ask questions and obtain advice during transactions will lead to increased transactions and use of the products and services in question. In addition, the ability to sign and/or fill out forms remotely will lead to incremental sales that may not otherwise have happened.

(2) New transaction fees. Customers will be willing to pay extra for the convenience and benefits offered by present invention. This will likely be in the form of a higher fee per transaction.

(4) Increased customer loyalty. More customer service interaction generally leads to higher customer loyalty (as well as higher product use). In addition, customers who are satisfied with the service they receive are more likely to recommend the institution in question.

(5) Higher level of security. The present invention provides improved authentication via the described video record and audit rail. Specifically, one aspect of the system of the present invention is to store in a database the recordings of video interactions, or selected parts of video interactions thereby enabling confirmation of the identity of the person entering into the transaction. It should also be understood that the present invention contemplates the use and integration of biometric methods of authentication, for example, such that an identity of a entering into a transaction is further authenticated (i.e. based on biometric measurements and not just based on visual identification). This increases the security of transactions and reduces costly fraud.

(6) Additional signatures now possible. The convenience provided by the present invention will allow the institutions to obtain signatures for transactions that currently do not require them. For example, a bank could require a signature at an ATM for withdrawals for transfers above a certain threshold. This increases the security of these transactions.

(7) Cost Reduction. The present invention provides cost reduction by enabling adoption of relatively low cost technology for enabling transactions that ordinarily require a signature resulting in savings of resources because of, for example, reduction of the number of in person meetings, or resulting in more efficient use of such resources, savings in travel time or travel expenses.

(8) Environmental Improvement. By reducing the need for travel to in person meetings the present invention benefits the environment by reducing hydrocarbon emissions and consumption of energy.

Revenue Model

As mentioned above, financial institutions in particular will derive significant revenue, customer loyalty, security and other benefits from installation and use of the present invention.

The present invention could be marketed directly to financial institutions or licensed to others for marketing to financial institutions. Given the complexity of the worldwide financial institutions industry, and the fact this is only one of a number of industries that could benefit from the present invention, a licensing strategy is the preferred method of generating revenue.

The present invention could be initially introduced via licensing agreements with selected leading companies in each major market segment. These companies (the "Master Licensees", or "ML") would be selected based on their market share, number of branches, past-performance, distribution networks and other factors that make them leaders within their market segment(s).

The ML's would be responsible for installing the product within their own networks as well as sub-licensing use to other companies within their segment ("Secondary Licensees"). Preferably, agreements with the ML's would not be exclusive but the ML's would benefit from being first in their market and, potentially, a share of fees from Secondary Licensees.

Under the Master Licensee agreement, each ML would be licensed to use the present invention within a specified territory, for a certain term. The ML would purchase or lease the apparatus at pre-determined prices/rates and receive product training and support.

The ML would pay an initial licensing fee proportionate to the size of the territory, performance targets and other variables. Under a typical agreement, ML would also pay an annual Maintenance Fee for service, training and upgrades, as well as a royalty per individual use.

Secondary licensee agreements would be structured similarly to the Master Licensee agreements. These agreements may be with the Master Licensee or directly with the applicant. In either case, the applicant would receive a portion of fees and royalties due from Secondary Licensees.

Other potential users of the technology such as companies or government institutions that enter into a large number of transactions ordinarily requiring signatures (such as legal agreements or application forms for a driver's license for example), as well as intermediaries such as law firms and service providers to government institutions, could be potential licensees.

Branch/ATM Example

In a representative implementation of the present invention, transactions are enabled between a customer and a financial institution. A customer wishing to conduct one of the ever-increasing number of transactions that require signatures enters a newly designed and secure LONG PEN™ Customer Service section of a financial institution. This new ATM environment could be designed in a similar fashion to the currently utilized sound proofed "spacious" hotel phone booths. Entry access to both the ATM's location and the LONG PEN™ Customer Service section could be controlled via personalized magnetic debit/credit cards or other accepted biometric authentication in conjunction with the correct input of an accepted Personal Identification Number (PIN).

Once the qualified customer (by PIN, for example) has entered the Video Customer Service Section of the system, no other access would be granted to other clients until such time as the current user had completed their transaction.

Pertaining to the increased need to authenticate bona fide clients and to provide the bank with an improved method for documenting and witnessing agreements for the purposes of non-repudiation, the LONG PEN™ system described herein, in a representative embodiment thereof, provides the financial institution the following advantages and integral assurances:

(i) standard currently accepted PIN code entry;
(ii) advanced security options available through biometric authentication;
(iii) a video/audio record of the transaction;
(iv) document page acceptance using: (a) electronic handwritten initials; (b) customer generated KeyGen encryption and machine generated page code "signatures"; (c) the use of audio/video time-code/document image imprint linked to the video record of the interaction. The image imprint is created in the following way: a physical page at one location is captured in an image which is presented to, annotated and signed by the customer and then committed to, by the customer when the transaction is completed, by "sending" the transaction. The Long-Pen™ then takes an image of the completed document and that image is then added to the "master file". This process also applies to a non-physical document except that the last image taken of the completed document as the document in this case is electronic; and
(v) generation of a customer signature or other handwriting printed locally at the bank on the final document, or saved electronically & authenticated through the generation of the Master File (previously defined).

Human interaction with the technology would be as follows (in accordance with a particular embodiment of the present invention):

(1) There would be a customer seating area.

(2) A dual purpose hi-resolution video screen of sufficient size to allow: (a) the user to connect to a customer service representative on a split screen; and (b) the display of a letter size document to be presented at a 1:1 ratio. It is anticipated that a 17 inch LCD computer monitor could be used for this purpose.

(3) A custom designed LCD writing input tablet and a pen (such as for example a magnetic pen) device also incorporating a video monitor which would be used to display at a 1:1 ratio the signing space of the target document.

(4) The welcome screen of the system would present the customer with a custom graphical user interface ("GUI") outlining the list of services available. It could also personally welcome the client using data scanned on the magnetic card and PIN code initially used to access the Video Customer Service Booth.

(5) At this stage the customer would be required to re-establish identity by a combination of biometric options such as, but not limited to: facial recognition, fingerprint scanning or signature/keystroke authentication.

(6) Upon successful completion of the second (biometric) authentication of the client, the user would review and select one of the advanced service options provided by this custom service.

Various aspects of an ATM banking application embodiment are illustrated in FIG. 1. This particular embodiment comprises a Customer Systems Entry (A), a LONG PEN™ Customer Interface (B), a System Communication VPN or Private Security Enhanced Network (C), and a Centralized Customer Service System Customer Service Interface (D).

The Customer Systems Entry (A) is a secure access point that preferably comprises a keypad and magnetic reader, and prompts a user for their standard PIN.

The LONG PEN™ Customer Interface (B) preferably comprises a LCD video monitor (1), a LCD writing tablet and pen (2), a customer service graphical user interface ("GUI") screen (3), a numeric keypad (4), a standard keyboard input device (5), a video conferencing window (6) and a biometric identity sensor (7).

The System Communication VPN or Private Security Enhanced Network (C) is preferably bidirectional, in that it is operable to carry video and audio information streams in both directions, along with the proprietary writing code. All data is encrypted and time coded, and the entire data feed and all transaction information are captured and stored on a client server.

The Centralized Customer Service System Customer Service Interface (D) preferably comprises an LCD video monitor (1), a pointing device (2), a customer service GUI screen (3), on-file customer image(s) (4), a standard keyboard input device (5), a videoconferencing window (6), on-file customer personal data (7), and the LONG PEN™ custom writing equipment connected via USB (8). It should be understood that present invention can be implemented using other hardware or software without departing from the substance of the present invention.

By way of example, a client may wish to apply for a personal loan which currently requires a witness and personal presence at the bank branch of the client. Depending on the size of the loan, in many instances applications are forwarded by the bank branch to a centralized application and approval center. The LONG PEN™ system would permit the institution the option of providing services currently managed at the branch level more directly utilizing a centralized service.

The LONG PEN™ Customer Service system would provide the client three ways to start the application process: (a) download the application to a home computer, review the document and then save it to his personal client file for later retrieval at a LONG PEN™ customer service location; (b) visit a LONG PEN™ service location and apply for and review the agreement using the system and then contact a video customer service representative to complete the application; or (iii) directly contact a LONG PEN™ video customer service representative to handle all aspects of the application.

In any of the methods listed above, the client would be able to review details of the document and sign off on terms and agreements made during the application process. All sections of the application pertinent to personal information, such as name, address, phone, employment records, social insurance number, etc. would automatically be filled in by the system, pulling the relevant data from the customers' centralized banking info on file at the bank.

Once the customer or Customer Service Representative as the case may be, has entered the required additional data using: (a) a standard keyboard input device provided by the system; or (b) handwriting input via the LCD tablet input device and magnetic pen, the LONG PEN™ system would then, if not already established, create a video conference connection between the bank and the client. This connection and all data would be securely transmitted using a Virtual Private Network or other private connectivity option.

On connection, the client would be presented with a customer service representative live via split screen video utilizing the LCD monitor and a framed GUI construction. On one portion of the screen the document in question would be displayed, on another part of the screen an image of the customer service representative on a third, further options available to the client.

The customer service representative would welcome the client (using authorized PIN and biometric approval as a foundation for authenticity). Additionally, the customer service representative would be able to visually confirm identity by referring to a digital photograph of the client automatically displayed at the bank end terminal which the client would have provided during the application process for enhanced customer service. In addition, or instead of this, biometric authentication could be utilized, including as explained above.

During the review of the document contents, terms and conditions, the client would confirm individual document page acceptance using: (a) electronic handwritten initials; (b) customer generated keygen encryption and machine generated page code "signatures"; or (c) the use of audio/video time-code/document image imprint linked to the video record of the interaction.

Once the client has verified the documents accuracy (or reflected handwritten changes), a final printout of the agreement is completed by the client and at the bank level the document is executed on a hard copy of the execution page using the LongPen™. This allows the client to regulate the number of original copies and to confirm that the electronically "notated" pages of the document are intact.

A signatory page (or card identifying the particular version of the agreement and linked to the particular original copy of the finalized agreement) is placed by the customer service representative into the custom LONG PEN™ writing machine and is preferably automatically signed by the system with a verifying document code used on all other reviewed and accepted pages of the document so that the client can review the "electronic binding" of the entire document prior to submitting his remote signature of acceptance. Alternatively, a digital image of the executed signatory page is take and attached to the Master File described above.

A copy of the completed and signed document would also be sent preferably, as printed and signed, to the clients email address (and/or the institution's customer profile accessible via the world wide web, or another delivery method) or their own records or the LONG PEN™ system could be equipped with a printing component which would allow the client to leave with an electronically encoded version of the document.

In our first example, a customer wishing to conduct one of the ever-increasing number of transactions that require signatures enters the secure LONG PEN™ section within an ATM's location. Access to both the ATM's location and the LONG PEN™ section is controlled via personalized debit/credit cards combined with a PIN. They are preferably accessible 24/7 and a list of locations with the right capabilities is available from the branch or on line.

The customer then enters his/her debit/credit card once again and enters identifying information. A menu appears on the screen in front of him/her which lists a number of sequential choices. Once the right choices are made, the customer presses a button that allows the dual-purpose screen to enter the video conferencing mode.

The screen prompts the customer to put on his/her headphones for privacy. A Customer Service person at the bank's (or other institution's) Interactive Customer Service centre then appears on the screen at the ATM. The Customer Service person can also view the customer on the screen at the Service Centre. "Good morning Mr. Marshall. My name is Kathy. How can I help you today?" Kathy, of course, knows who the customer is because of the information entered to access the system.

Mr. Marshall then asks Kathy about the specific transaction he has in mind. In this case, he is dealing with a new bank (other than his normal bank) and wants to open a Savings Account. He explains that he prefers the interest rate they offer and Kathy tells him he just has to fill out and sign a New Account application.

Kathy asks more detailed questions about the type of account and then an electronic version of the New Account form appears on the screen where Mr. Marshall can securely enter his home address and other personal information. This information is automatically printed onto a New Account form at the Service Centre and Kathy now reappears. "Have you read the form carefully and do you have any questions", she asks. Mr. Marshall nods his agreement to having read the form and does ask a question which Kathy handily answers. "Okay", she says. "All we need is for you to sign the form".

Kathy then places the form on the specially-designed LONG PEN™ writing surface and asks the customer to take the pen next to the LONG PEN™ writing tablet at the ATM end. Mr. Marshall can see how his signature would be reproduced exactly on the signature line of the New Account form at the Service Centre. He then signs at the ATM location and watches as the pen at Kathy's end instantly reproduces his exact signature.

"Congratulations Mr. Marshall. You now have a new savings account. Please write down the number (which she shows him) and pick up your copy of the confirmation which is being printed right now. Would you like to deposit some funds in the account today?"

Mr. Marshall tells Kathy that he would like to transfer some funds from his savings account at his other bank. They discuss the details and she produces a Bank-to-Bank transfer form for him to fill out and then sign in front of Kathy. Once this transaction is completed, he gets a deposit confirmation and Kathy informs him the transfer will happen within a specified short period (minutes or hours) as the video authentication of the transfer will be automatically e-mailed to his other bank.

By pressing a button, both Mr. Marshall and Kathy receive a hard-copy video record of their interaction and one is also e-mailed to Mr. Marshall. They say goodbye and Mr. Marshall signs off and walks out of the ATM location. All the information at Kathy's end has already been automatically uploaded to the main servers at the bank's head office.

Bank Equipment Architecture

In addition to the video interface outlined above, the bank would install custom LONG PEN™ writing equipment which could be custom designed for the intended use. Compared to the current system design and size footprint, custom applications would likely allow the company to reduce equipment manufacturing costs, system mass, area, weight, and improve output speed and accuracy.

Additionally, the bank video monitor would incorporate a custom GUI interface which would present the customer service representative a broad range of information relative to the "connected client". For example, bank history, current ratings, savings and debt information and a credit worthiness overview.

Home to Institution Example

In a further example of the implementation of the present invention, the LONG PEN™ technology enables transactions between a customer at home and a financial institution. At the customer's home, there is a portable terminal which plugs into the home desktop or notebook via a USB port or similar connection that is capable of transmitting signatures in accordance with the present invention. It includes a writing surface and pen means. A digital video camera is also provided that connects to the computer and will allow the customer service centre at the institution to see and interact with the customer.

At the customer service end, there is preferably a secure access location where only designated employees can enter. Within this secure area, one or more terminals operable for receiving signatures from the customer in accordance with the present invention are provided. As well, there is a video camera, microphone, speakers and/or a monitor for communicating with the customer.

This time the customer wishes to conduct a transaction with his securities firm right from the comfort of his home/ and his home computer. It is the type of transaction for which his securities agent usually requires originally-signed forms and these are typically handled through the mail.

Various aspects of a mobile banking application embodiment are illustrated in FIG. 2. This particular embodiment comprises a Customer Laptop (A), a LONG PEN™ Online Customer Interface (B), a System Communication VPN or Private Security Enhanced Network (C), and a Centralized Customer Service System Customer Service Interface (D).

The Customer Laptop (A) is equipped with an Internet connection. The customer logs on to the secure site of the securities firm using authentication data, such as the customer's bank card information and password.

The LONG PEN™ Customer Interface (B) preferably comprises a standard consumer laptop (1), a custom LCD writing tablet and pen configured for a USB2 interface or other connectivity method (2), a customer service GUI screen (3), a standard keyboard input device (4), a video conferencing window (5) and a biometric identity sensor (6).

The System Communication VPN or Private Security Enhanced Network (C) is preferably bidirectional, in that it is operable to carry video and audio information streams in both directions, along with the proprietary writing code used in LONGPEN™ and particularized in the above referenced PCT Application. All data is preferably encrypted and time coded, and the entire data feed and all transaction information are captured and stored on a client server.

The Centralized Customer Service System Customer Service Interface (D) preferably comprises an LCD video monitor (1), a pointing device (2), a customer service GUI screen (3), on-file customer image(s) (4), a standard keyboard input device (5), a videoconferencing window (6), on-file customer personal data (7), and LONG PEN™ custom writing equipment connected via USB2 (8).

By way of example, Matthew, the customer, has equipped his home computer with a portable writing device (with tablet and pen) and a digital video camera. He first accesses the institution's website via high-speed Internet and then proceeds to his personal accounts after entering passwords and other required data.

He then pulls down a menu of transactions and selects the interactive one he wants to conduct. In this case, Matthew wants to close an earlier account he had set up and transfer the funds to his second, more highly-featured account. He enters some required information and clicks on customer service interaction. Graham, an agent at the firm's interactive customer service centre, appears on the screen. "Hello Mr. Gibson. My name is Graham and I am here to help you complete this transaction (Graham can see Matthew by means of Matthew's video camera)."

Graham already knows that Matthew wants to close the one account, so he produces an account closing form, the details of which Matthew can fill out through his keyboard and mouse. When Matthew reaches the signature stage, Graham asks whether he has read the form and understands it. Matthew, in fact, has a question about a penalty fee imposed by the firm for closing the account within a specified period from opening date. After discussing the particular situation with Graham, and emphasizing the fact the funds will be transferred to a second account in the same company, Graham agrees to waive the fee.

Graham then produces a printout of the account closing form and points to where Matthew needs to sign. Matthew signs using his portable terminal and can see his signature instantly reproduced on Graham's terminal. He then asks Graham to initial the clause confirming the penalty fee is waived, which he does. A copy of the transaction confirmation is then printed by Matthew on his home printer.

The funds then need to be transferred to the second account. Graham first discussed the balance on the closed account with Matthew for verification. He then points out a transfer form which incorporates the right amount and the two account numbers. He asks Matthew to verify the numbers and then sign the transfer using the terminal.

Once this second transaction is completed, Matthew prints out a second confirmation form and double checks the balance on the remaining account. He and Graham agree everything has been completed and a video record of the interaction is made. This record is immediately uploaded to the firm's main server and e-mailed to Matthew.

On-Line Banking Example

An alternate embodiment of the system comprises a "peripheral" component package which is sent to existing on-line banking clients which would then interface with the clients existing computing hardware. In this case, the client is able to conduct as broad a range of services from the comfort of their own home.

The peripheral implementation of the present invention option would be comprised of, for example: a custom small footprint LCD writing input tablet with USB2 or better connectivity interface; a magnetic input pen in order to write on the custom tablet, biometric authentication using signature/keystroke inputs; and a USB camera and custom video conferencing software.

Office to Office Example

In a yet further example of implementation of the present invention, LONG PEN™ enables transactions between two offices. Preferably, each office location will maintain secure-access locations where only designated employees can enter and exit. Each office will maintain one or more terminals that allow communicating of signatures or other handwriting, or one or more "B" terminals that can receive handwriting and/or signatures from a remote location. Or, preferably, each office will maintain terminals that are operable to both send and receive. Two-way audio video communication between the offices will be provided via video cameras, microphones, speakers and/or monitors.

In this regard, the present invention can be utilized as between bank branches, between bank head offices, head office to branch, between central banks, etc. In this case, the example relates to a Toronto-based customer who is in Paris on business and forgot to sign his mortgage renewal papers before leaving Toronto. The papers are due today or his preferential interest rate will no longer be available.

The customer looks up where his Canadian bank has an office(s) in Paris and he knows that all foreign branch locations of his bank have interactive capabilities in accordance with the present invention. He goes to the branch and explains his predicament to a customer service representative.

After checking his credit card and other identification, the customer is taken to an interactive communication room in accordance with the present invention. The local customer service representative establishes video communication with his branch in Toronto and introduces him/her to the Toronto customer service rep. The local representative then leaves his communication room so the customer can interact in private.

At the Toronto branch, Jane recognizes Mr. Jones and greets him immediately. "How can we help you Mr. Jones? I hope you are having an enjoyable trip to Paris." "Jane, I forgot to sign my mortgage renewal papers the day before yesterday". "No problem Mr. Jones, I'll get them."

Jane uses her identity card to leave and enter the secure room at the Toronto branch. She returns promptly with the mortgage documents and flips to the signature page. "Okay Mr. Jones. You need to initial here and here, sign here and date your signature." Mr. Jones uses the system at the Paris branch and initials, signs and dates the document. Each piece of handwriting transfers instantly and accurately onto the mortgage documents in Toronto. "I will be your witness Mr. Jones", adds Jane as she signs and dates as a witness next to Mr. Jones' signature while he is watching.

Once the transaction is completed, both Mr. Jones and the Toronto Branch receive a video record of the interaction. Copies are also e-mailed to the Paris branch for their records and to Mr. Jones' e-mail address. A copy is immediately uploaded to the bank's main server in Toronto.

Various other extensions of the present invention are possible. For example, it should be understood that the present invention contemplates the use of various other means of authentication. For example, the present invention enables the capture of data that enables the analysis of the customer's signature or other handwriting for authentication purposes. Known methods analyze within parameters the time that it takes for an individual to trace particular portions of a signature as a means of authentication. The present invention specifically contemplates capturing this data and making acceptance of a financial transaction dependent on this additional means of authentication. It should also be understood that while the present invention references specific plotting apparati as examples of plotting devices to be used in conjunction with the present invention, other plotting devices may be used. The present invention contemplates, for example, the use of a scaled down version of the referenced plotting devices. It should be understood that the present invention specifically contemplates the extension of the processes described to accommodate the various particular needs of financial transactions and financial institutions, whether in connection with integration of existing or new systems, computer programs or processes related to financial transactions.

Legal Transactions

It should be understood that the methods, system, and computer program described above is readily applied to the closing meeting context described above to process handwriting changes and signatures to be associated with documents, and authenticating the signatories, the documents, or overall legal transactions associated therewith.

It is obvious to a person skilled in the art that various system architectures, distribution of resources, processes incorporating the methods described above, software structure, different from as described above, but relying on the subject matter described can be provided or devised by those skilled in the art. The present invention is not limited to any particular system architecture, distribution of resource, network architecture, resource allocation, workflow or software structure.

The invention claimed is:

1. In an environment in which a first person enters into a transaction with a second person by handwritten documentary execution, the environment including a first location separate from and in communication by a network with a second location, the first and second locations respectively having the first and second parties simultaneously present, wherein the first location has (i) a first plotter, (ii) a first video capture system, and (iii) a first video renderer, and wherein the second location has: (i) a second document copy representing the transaction, (ii) a second digital writing pad, and (iii) a second video capture system, a method comprising a plurality of steps each being performed by hardware executing software, wherein the steps include:

receiving, at the first location for delivery to the first plotter, signals output by the second digital writing pad as generated by use of a stylus by the second person to input handwritten indicia to the second digital writing pad:

receiving, at the first location for delivery to and rendering by the first video renderer output from the second video capture system at the second location and including at least a video capture of:

the second person at the second location; and handwritten indicia being applied by the second person to the second document copy at the second location:

rendering, by the first video renderer at the first location, the received output from the second video capture system at the second location:

and storing, at the first location, transaction audit information for the transaction to substantiate non-repudiation of the transaction by the second person, wherein the transaction audit information includes:

the received signals output by the second digital writing pad; and the received output from the second video capture system at the second location.

2. The method as defined in claim 1, characterized in that the first location and the second location are linked to provide two-way audiovisual communication therebetween.

3. The method as defined in claim 1 characterized in that the received signals output by the second digital writing pad correspond the signature of the second person.

4. The method as defined in claim 1 characterized in that the received signals output by the second digital writing pad correspond to handwritten markups by the second person to be applied by the first plotter to the first document copy at the first location.

5. The method as defined in Claim 1, wherein the steps further comprise:
  transmitting, for delivery to a central server in communication with the first location, the received signals output by the second digital writing pad; and
  receiving information at the first location, from the central server, in a transmission that includes results of a handwriting analysis for the second person as a function of the received signals output by the second digital writing pad.

6. The method as defined in claim 1, wherein the storing step further comprises: the storing, at the first location, in the transaction audit information additional transaction audit information selected from the group consisting of:
  (a) identification data for the second person including username/password data;
  (b) biometric authentication data for the second person;
  (c) one or more identifiers associated with the second documents;
  (d) a time log identifying the time of the transaction;
  (e) location data for the second location; and
  (f) a combination of the foregoing.

7. The method as defined in claim 1, wherein:
the first location has:
  a first document copy representing the transaction;
  a first digital writing pad; and
  a first video capture system;
the second location has:
  a second plotter, and
  a second video renderer;
and
the steps further comprise:
  transmitting, from the first location for delivery to the second plotter at the second location, signals output by the first digital writing pad as generated by use of a stylus by the first person to input handwritten indicia to the first digital writing pad;
  receiving, at the first location for delivery to and rendering by the first video renderer output from the second video capture system at the second location and including at least a video capture of plotter written indicia being applied by the second plotter to the second document copy at the second location corresponding to the transmitted signals generated by the first digital writing pad;
  transmitting, from the first location for delivery to and rendering by the second video renderer at the second location, output from the first video capture system at the first location and including at least a video capture of the first person at the first location;
and
  transmitting, from the first location for delivery to and rendering by the second video renderer at the second location, output from the first video capture system at the first location and including at least a video capture of:
    handwritten indicia being applied by the first person to the first document copy at first location; and
    plotter written indicia being applied by the first plotter to the first document copy at the first location corresponding to the received signals generated by second digital writing pad.

8. A non-transient computer readable medium comprising software executable by hardware to perform the method of claim 1.

9. The method as defined in claim 2 characterized in that the transaction audit information further comprises one or more video frames and audio files received at the first location as output from the second video capture system at the second location that demonstrates participation in the two-way audiovisual communication by the second person to the transaction.

10. The method as defined in claim 7, wherein the steps further comprise receiving at the first location from the second location, transaction audit information for the first person to the transaction and including:
  the signals output by the first digital writing pad as transmitted to the second location; and
  the output from the first video capture system at the first location as transmitted to the second location.

11. In an environment in which a first person enters into a transaction with a second person by handwritten documentary execution, the environment including a first location separate from and in communication by a network with a second location, the first and second locations respectively having the first and second parties simultaneously present, the first and second locations respectively having first and second copies of a document representing the transaction, the first and second locations respectively having first and second computing systems, the first and second computing systems, respectively being in local communication with: (i) first and second digital writing pads, (ii) first and second plotters, (iii) first and second video capture systems, and (iv) first and second video renderers, a method comprising a plurality of steps each being performed by hardware executing software, wherein the steps include:
  transmitting, from the first computing system for delivery to the second plotter at the second location via the second computing system, signals output by the first digital writing pad as generated by use of a stylus by the first person to input handwritten indicia to the first digital writing pad;
  receiving, by the first computing system for delivery to the first plotter, signals output by the second digital writing pad as generated by use of a stylus by the second person to input handwritten indicia to the second digital writing pad;
  transmitting, from the first computing system for delivery to the second computing system and rendering by the second video renderer at the second location, output from the first video capture system at the first location and including at least a video capture of the first person at the first location;
  transmitting, from the first computing system for delivery to the second computing system and rendering by the second video renderer at the second location, output from the first video capture system at the first location and including at least a video capture of:
    handwritten indicia being applied by the first person to the first document copy at first location; and
    plotter written indicia being applied by the first plotter to the first document copy at the first location corresponding to the received signals generated by second digital writing pad;
  receiving, at the first computing system for delivery to and rendering by the first video renderer, output from the second video capture system at the second location and including at least a video capture of:
    the second person at the second location;

handwritten indicia being applied by the second person to the second document copy at the second location; and plotter written indicia being applied by the second plotter to the second document copy at the second location corresponding to the transmitted signals generated by the first digital writing pad;

rendering, by the first video renderer at the first location, the received output from the second video capture system at the second location; and storing, in a storage device in communication with the first computing system, transaction audit information for the transaction to substantiate non-repudiation of the transaction by the second person, wherein the transaction audit information includes:

the received signals output by the second digital writing pad; and the received output from the second video capture system at the second computing system.

12. The method as defined in claim 11, characterized in that the first computing system and the second computing system are linked to provide two-way audiovisual communication therebetween.

13. The method as defined in claim 11 characterized in that the received signals output by the second digital writing pad correspond to the signature of the second person.

14. The method as defined in claim 11 characterized in that the received signals output by the second digital writing pad correspond to handwritten markups by the second person to be applied by the first plotter to the first document copy at the first computing system.

15. The method as defined in claim 11 wherein the steps further comprise:

transmitting, for delivery to a central server in communication with the first computing system, the received signals output by the second digital writing pad; and receiving information at the first computing system, from the central server, in a transmission that includes results of a handwriting analysis for the second person as a function of the received signals output by the second digital writing pad.

16. The method as defined in claim 11, wherein the storing step further comprises storing, at the first computing system, in the transaction audit information additional transaction audit information selected from the group consisting of:

(a) identification data for at least one of the first and second persons including username/password data;
(b) biometric authentication data for at least one of the first and second persons;
(c) one or more identifiers associated with at least one of the first and second document copies;
(d) a time log identifying the time of the transaction;
(e) location data for at least one of the first and second computing systems; and
(f) a combination of the foregoing.

17. The method as defined in claim 11, wherein the steps further comprise transmitting, from the first computing system for delivery to the second computing system, the stored transaction audit information for the second person to the transaction.

18. The method as defined in claim 11, wherein the steps further comprise receiving, at the first computing system from the second computing system, transaction audit information for the first person to the transaction and including:

the signals output by the first digital writing pad as transmitted to the second computing system; and the output from the first video capture system at the first computing system as transmitted to the second computing system.

19. The method as defined in claim 11 characterized in that the received signals output by the second digital writing pad correspond to the signature of the second person.

20. A non-transient computer readable medium comprising software executable by hardware to perform the method of claim 11.

21. The method as defined in claim 12 characterized in that the transaction audit information further comprises one or more video frames and audio files received at the first computing system as output from the second video capture system at the second computing system that demonstrates participation in the two-way audiovisual communication by the second person to the transaction.

22. In an environment in which a first person enters into a transaction with a second person by handwritten documentary execution, the environment including a first location separate from and in communication by a network with a second location, the first and second locations respectively having the first and second parties simultaneously present, the first and second locations respectively having first and second document copies representing the transaction, the first and second locations respectively having first and second digital writing pads, the first and second locations respectively having first and second plotters, the first and second locations respectively having first and second video capture systems, the first and second locations respectively having first and second video renderers, a method comprising a plurality of steps each being performed by hardware executing software, wherein the steps include:

receiving, at the first digital writing pad at the first location, handwritten indicia as manual input to the first person by use of a stylus by the first person;

storing output from the first digital writing pad at the first location that includes signals output by the first digital writing pad as generated by the use of the stylus by the first person to input the handwritten indicia to the first digital writing pad;

transmitting, from at the first location for delivery to the second plotter at the second location, the stored output from the first digital writing pad;

receiving, at the first location, signals output by the second digital writing pad at the second location as generated by use of a stylus by the second person to input handwritten indicia to the second digital writing pad;

inputting, to the first plotter at the first location, the received signals output by the second digital writing pad at the second location to enable the first plotter at the first location to apply plotter written indicia corresponding to the received signals output by the second digital writing pad at the second location;

capturing, with the first video capture system at the first location, at least a video capture of the first person at the first location;

transmitting, from the first location for delivery to and rendering by the second video renderer at the second location, output from the first video capture system at the first location and including at least a video capture of the first person at the first location;

capturing, with the first video capture system at the first location, at least a video capture of:

handwritten indicia being applied by the first person to the first document copy at first location; and plotter written indicia being applied by the first plotter to the first document copy at the first location;

transmitting, from the first location for delivery to and rendering by the second video renderer at the second location, the captured video capture of the first video capture system at the first location and including at least a video capture of:
  handwritten indicia being applied by the first person to the first document copy at first location; and
  plotter written indicia being applied by the first plotter to the first document copy at the first location;
receiving, at the first location, output from the second video capture system at the second location and including at least a video capture of the second person at the second location;
receiving, at the first location, output from the second video capture system at the second location and including at least a video capture of:
  handwritten indicia being applied by the second person to the second document copy at the second location; and
  plotter written indicia being applied by the second plotter to the second document copy at the second location corresponding to the transmitted signals generated by the first digital writing pad;
rendering, with the first video renderer at the first location, the received output from the second video capture system at the second location;
and
storing, at the first location, transaction audit information to substantiate non-repudiation of the transaction by the second person, wherein the transaction audit information includes:
  the signals output by the second digital writing pad at the second location as generated by use of the stylus by the second person to input handwritten indicia to the second digital writing pad; and
  the output from the second video capture system at the second location and including at least the video capture of:
    the second person at the second location;
    the handwritten indicia being applied by the second person to the second document copy at the second location; and
    the plotter written indicia being applied by the second plotter to the second document copy at the second location corresponding to the transmitted signals generated by the first digital writing pad.

23. The method as defined in claim 22, characterized in that:
  the first location and the second location are linked to provide two-way audiovisual communication there between; and
  the transaction audit information further comprises one or more video frames and audio files received at the first location as output from the second video capture system at the second location that demonstrates participation in the two-way audiovisual communication by the second person to the transaction.

24. A non-transient computer readable medium comprising software executable by hardware to perform the method of claim 22.

* * * * *